(12) United States Patent  (10) Patent No.: US 7,445,430 B2
Kao et al. (45) Date of Patent: Nov. 4, 2008

(54) FAN COVER ASSEMBLY

(75) Inventors: Kuang-Yi Kao, Taipei (TW); Lin-Wei Chang, Taipei (TW); Chi-Kang Hsieh, Taipei (TW)

(73) Assignee: Inventec Corporation (TW)

( * ) Notice: Subject to any disclaimer, the term of this patent is extended or adjusted under 35 U.S.C. 154(b) by 302 days.

(21) Appl. No.: 11/404,526

(22) Filed: Apr. 14, 2006

(65) Prior Publication Data

US 2007/0054611 A1   Mar. 8, 2007

(30) Foreign Application Priority Data

Sep. 7, 2005   (TW) .............................. 94215366 U

(51) Int. Cl.
*B60J 1/20* (2006.01)
(52) U.S. Cl. .............. 415/213.1; 415/121.2; 415/214.1; 415/220
(58) Field of Classification Search .............. 415/213.1, 415/121, 2, 220, 214.1
See application file for complete search history.

(56) References Cited

U.S. PATENT DOCUMENTS 6,213,819 B1 * 4/2001 Fan ............................ 439/894
6,236,564 B1 * 5/2001 Fan .......................... 415/213.1
6,556,437 B1 * 4/2003 Hardin ..................... 415/213.1
6,783,325 B1 * 8/2004 Hileman et al. .......... 415/213.1

\* cited by examiner

*Primary Examiner*—Igor Kershteyn
(74) *Attorney, Agent, or Firm*—Peter F. Corless; Steven M. Jensen; Edwards Angell Palmer & Dodge LLP

(57) ABSTRACT

A fan cover assembly is proposed for installing one or more fans therein, including: a fan frame having a first blocking portion, a second blocking portion, and a third blocking portion, wherein the second blocking portion includes at least an upper blocking portion and at least a lower blocking portion, which are positioned in a stagger manner and having a containing space formed therebetween; and a cover body installed in the containing space, with edges thereof being formed with openings corresponding to the upper blocking portions. During assembly, the first blocking portion is opened to allow the cover body to pass through the upper blocking portions via the openings and stop at the lower blocking portions, the cover body is pushed to abut against the third blocking portion, and then the first blocking portion is closed to tightly join the cover body to the fan frame without using extra tools.

12 Claims, 5 Drawing Sheets

FAN COVER ASSEMBLY

BACKGROUND OF THE INVENTION

1. Field of the Invention

The present invention relates to fan assemblies, and more particularly, to a fan cover assembly configured to enhance heat dissipation performances of electronic devices including computer server systems.

2. Description of the Related Art

A continuous and rapid progress in integrated circuit designs and manufacturing technologies advances and facilitates concentration of integrated circuits. To increase data processing speed and working efficiency, server systems are primarily installed and configured to comprise a variety of integrated circuits, such as a CPU or chips etc., in an extremely small area in order to save the limited space. On the other hand, as speed and capacity increases the performance of heat dissipation becomes more difficult to protect server systems from high temperature damage generated therefrom that adversely affects normal function of the system. Hence, a variety of fan assemblies at low cost with high efficiency are utilized with electronic devices, such as computers.

Referring generally to FIG. 1, a conventional fan assembly 1 to promote cooling of a desired component is illustrated. As shown, the periphery of fan leaves 10 of a fan structure 1 is provided with a protective frame 12 but not the direction of air outlets 14. While such a fan structure is widely applied to heat dissipation of the CPU of a computer unit, this configuration is inherent with a drawback as it inevitably poses a potential danger in use. When the design of above heat-dissipation fan is applied to server systems, of which the check-up of hardware system and the number of times of assemblage and disassembling are more frequent than conventional personal computers, the chances of colliding are greatly increased if without the provision of a protective frame, which may likely damage integrated circuits configured in server systems due to the dense configuration and connection therebetweeen. Referring further to FIG. 2, another prior art fan assembly is depicted which only differs from the fan assembly illustrated in FIG. 1 in that there is a protective frame 24 provided in the outlet direction 22 of the fan leaves 20 of the fan assembly 2. As shown, the protective frame 24 is fastened onto a protective frame 28 configured at the periphery of fan leaves 20 by means of four screws 26, thereby protecting fan leaves 20 from being collided with external objects that may otherwise damage the integrated circuits connected with the fan assembly 2 as a result.

While the foregoing fan assembly achieves the purpose of protection, it necessitates the use of a plurality of fasteners, such as screws, for fastening onto a protective frame to be disposed in a single outlet. This increases not only the number of fasteners and protective frames, but also the time for fastening operation and is therefore cost-ineffective and time-inefficient. Moreover, it requires tools such as a screwdriver to disassemble when needed and that increases inconvenience as well.

Accordingly, how to provide a novel fan assembly that is convenient to assemble and disassemble without requiring any fasteners, is a critical issue to resolve.

SUMMARY OF THE INVENTION

In light of aforementioned shortcomings of a conventional structure, a primary objective of the present invention is to provide a novel fan cover heat dissipation assembly that realizes effectiveness of high temperature heat dissipation without requiring additional fasteners.

Another primary objective of the present invention is to provide a fan cover heat dissipation assembly that does not need tools for assembling and disassembling.

To achieve aforementioned and other objectives, the fan cover heat dissipation assembly of the present invention comprises a fan frame and a cover body, wherein the fan frame comprises a first blocking portion, a second blocking portion, and a third blocking portion.

In an embodiment of the invention, the fan frame has an upside-down/inverted U shape, wherein the first blocking portion is an elastic constituent element having one end thereof fastened onto at least one edge of the fan frame. The second block portion is formed on each of two parallel sides of the fan frame, and each side respectively comprises one or more upper blocking portions and one or more lower blocking portions, which are positioned in a stagger manner, wherein a containing space is formed between the upper blocking portions and the lower blocking portions. The third blocking portion is perpendicular to two parallel sides of the second blocking portion. The edges of the cover body are formed with a plurality of openings that correspond to the shape and number of the upper blocking portions. During assembly, the first blocking portion is opened so that the cover body can pass through upper blocking portions via the openings and stop at the lower blocking portions, and then, the cover body is pushed to abut against the third blocking portion, and then the first blocking portion is closed to thereby tightly join the cover body to the fan frame.

In another embodiment of the invention, one end of the first blocking portion, opposite to the other end thereof being fastened to the fan frame, is formed with a bending portion to thereby fastening the cover body therewith.

In another embodiment of the invention, the upper blocking portion and lower blocking portion are formed by means of a stamping technique.

In still another embodiment of the invention, the upper blocking portion and lower blocking portion are formed by means of a forging technique.

In still another embodiment of the invention, the upper blocking portion is formed between the lower blocking portion.

In still another embodiment of the invention, the fan frame is made of a metallic material.

The fan cover assembly of the invention can be easily assembled via the first blocking portion, the second blocking portion, and the third blocking portion of the fan frame to fasten the cover body thereon. As it requires no extra fasteners or tools to assemble the fan frame with the cover body, the present invention can improve on the prior art to increase efficiency in assembly.

BRIEF DESCRIPTION OF THE DRAWINGS

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

A detailed description of structure, devices and characteristics of a practicable preferred embodiment of the present invention in accompaniment with drawings is disclosed hereinafter.

Figure 1:
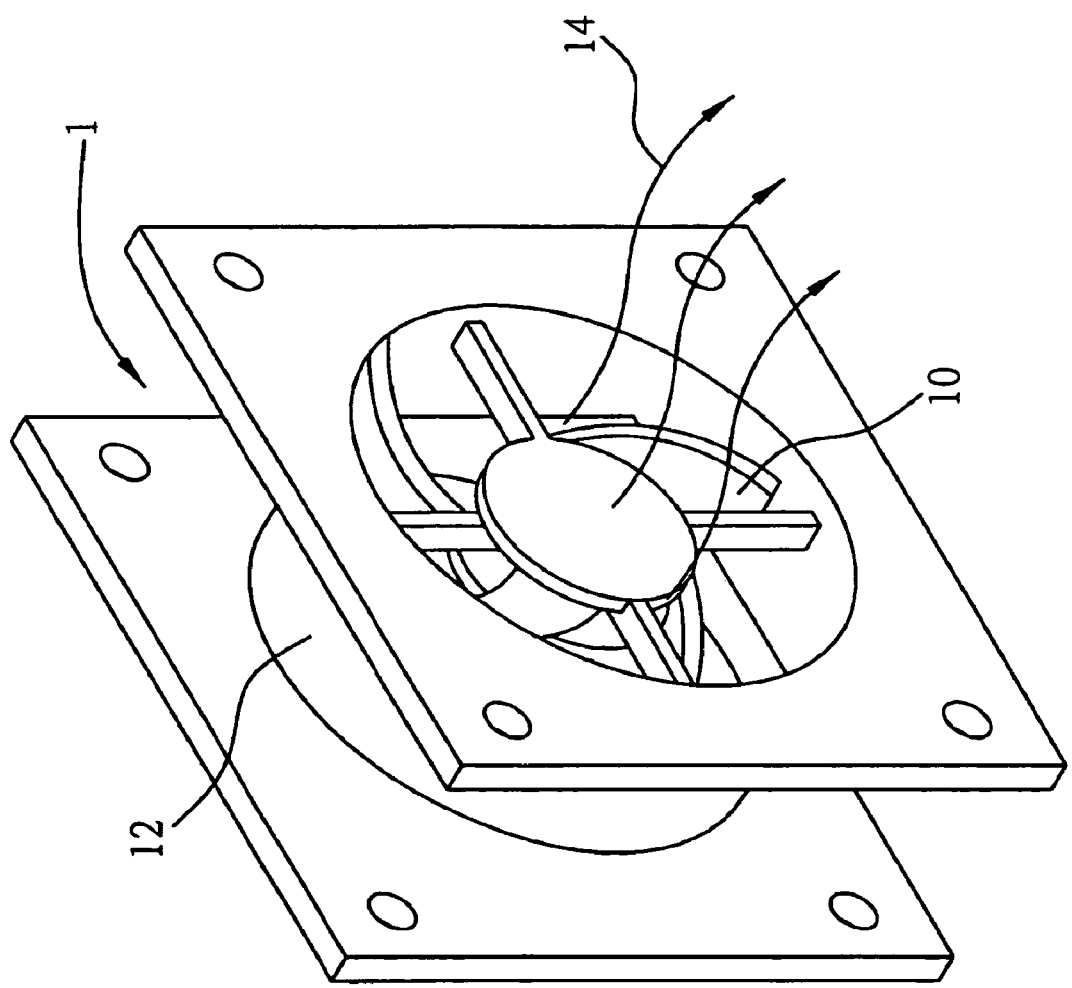
FIG. 1 shows a perspective view of a conventional heat-dissipation fan structure.
Figure 2:
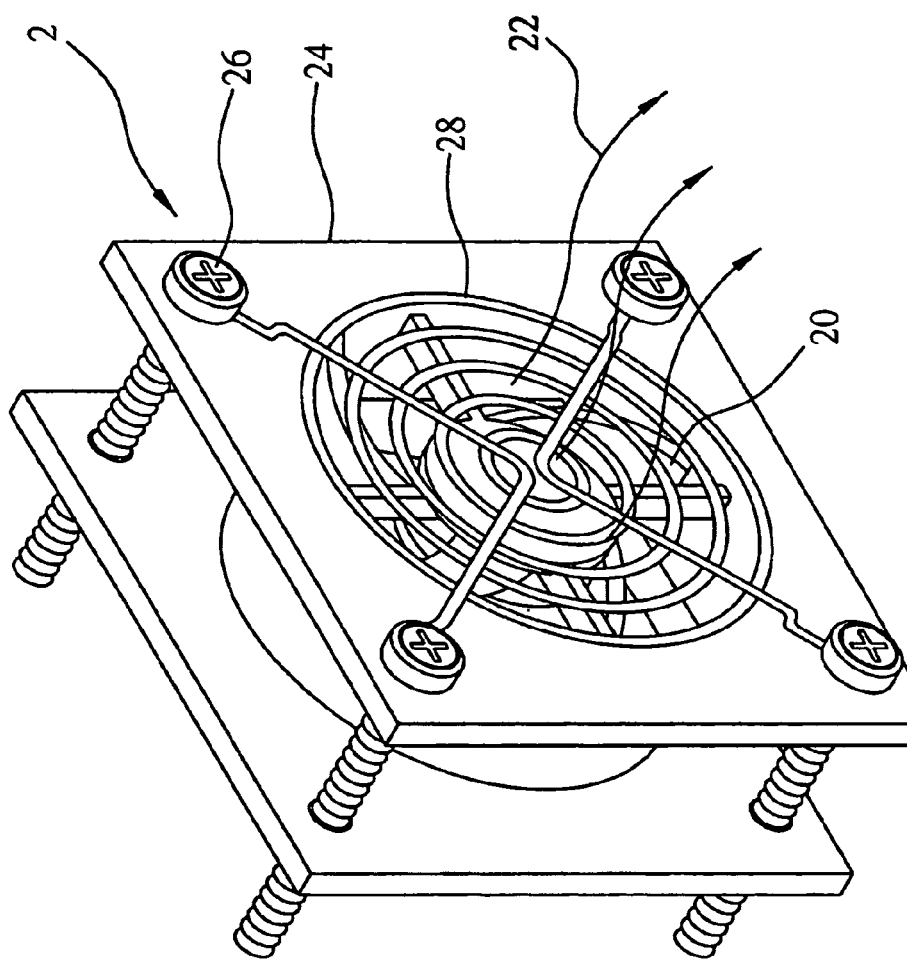
FIG. 2 shows another perspective view of a conventional heat-dissipation fan cover assembly.
Figure 3:
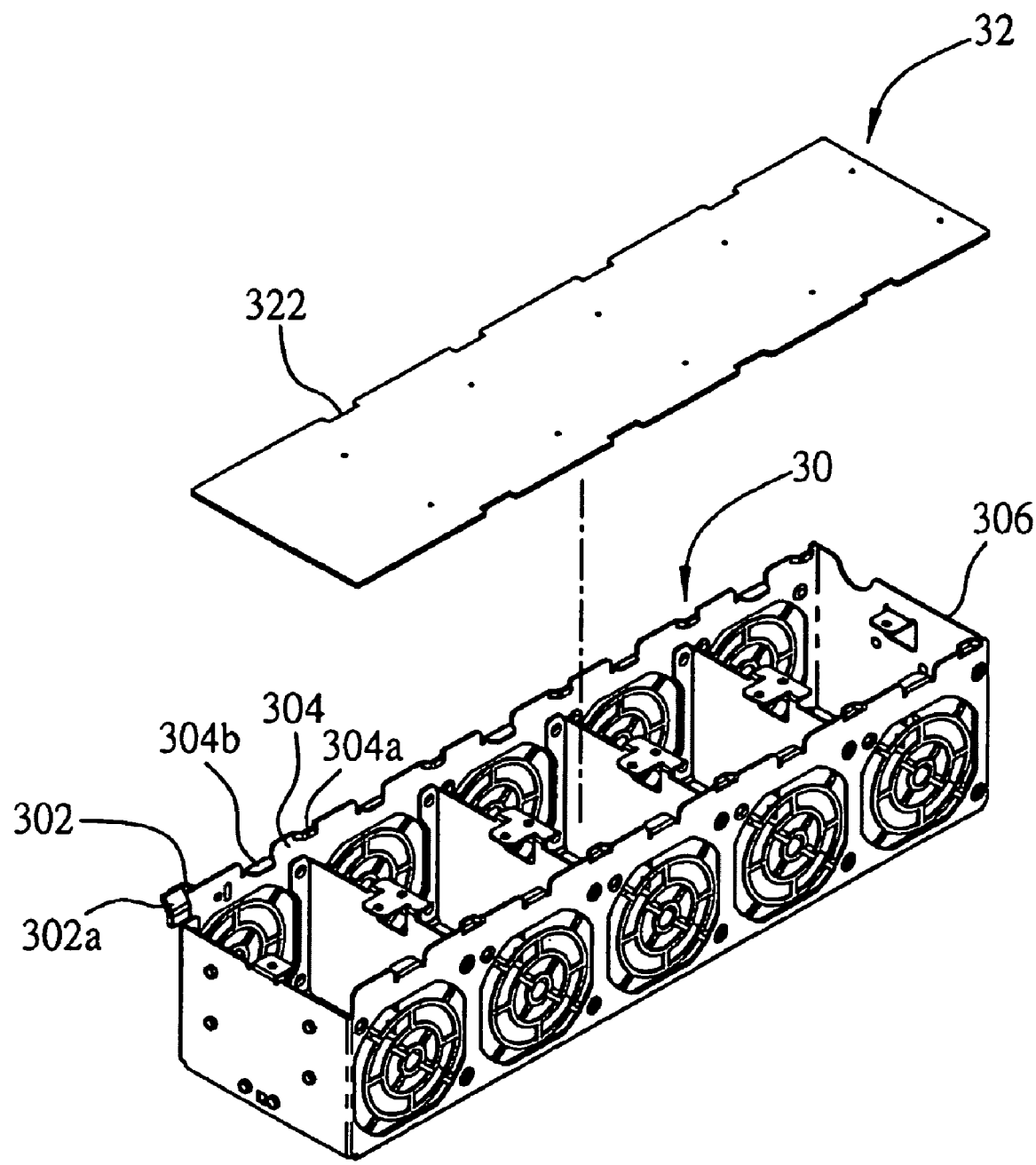
FIG. 3 shows a cross sectional view of the fan cover assembly according to the present invention.

Referring to FIG. 3, a fan cover heat dissipation assembly of the present invention is illustrated, primarily comprising and so structured to include a fan frame 30 and a fan cover body 32, wherein, the fan frame 30 is constructed to comprise a first blocking portion 302, a second blocking portion 304, and a third blocking portion 306.

As shown in this embodiment of the invention, the fan frame 30 is made of a metallic material having an inverted U shape, wherein the first blocking portion 302 is an elastic member with one end thereof fastened onto at least one edge of the fan frame. More specifically, the first block portion 302 is a metal structure and can be fastened onto an edge of the fan frame 30 by means of welding, locking, or adhesion. In addition, one end of the first blocking portion 302 to be correspondingly fastened to the fan frame may be formed to include a bending portion 302a for fastening the cover body therewith. The bending portion 302a may be formed by means of a pressing method.

The second blocking portion 304 is formed on the edges of two parallel sides for containing said cover body 32. As shown, the distance in between two parallel sides and the length of each side respectively equals to or slightly larger than the width and length of the cover body 32, each of two sides comprising at least one upper blocking portion 304a and one lower blocking portion 304b at a position crossed one another. The space between upper blocking portion 304a and lower blocking portion 304b is constructed to receive the cover body 32, the height of the containing space being equal to or slightly larger than the thickness of the cover body 32. In this embodiment, the upper blocking portion 304a and lower blocking portion 304b are formed by means of a stamping or forging technique. Specifically, each of two parallel sides is formed with five lower blocking portions 304 and four upper blocking portions 304a that are respectively formed in between the five lower blocking portions 304b.

The third blocking portion is perpendicular to two sides of the second blocking portion 304.

The edges of cover body 32 are configured to include a plurality of openings 322 that correspond to the shape and number of the upper blocking portion 304a.

Figure 4A:
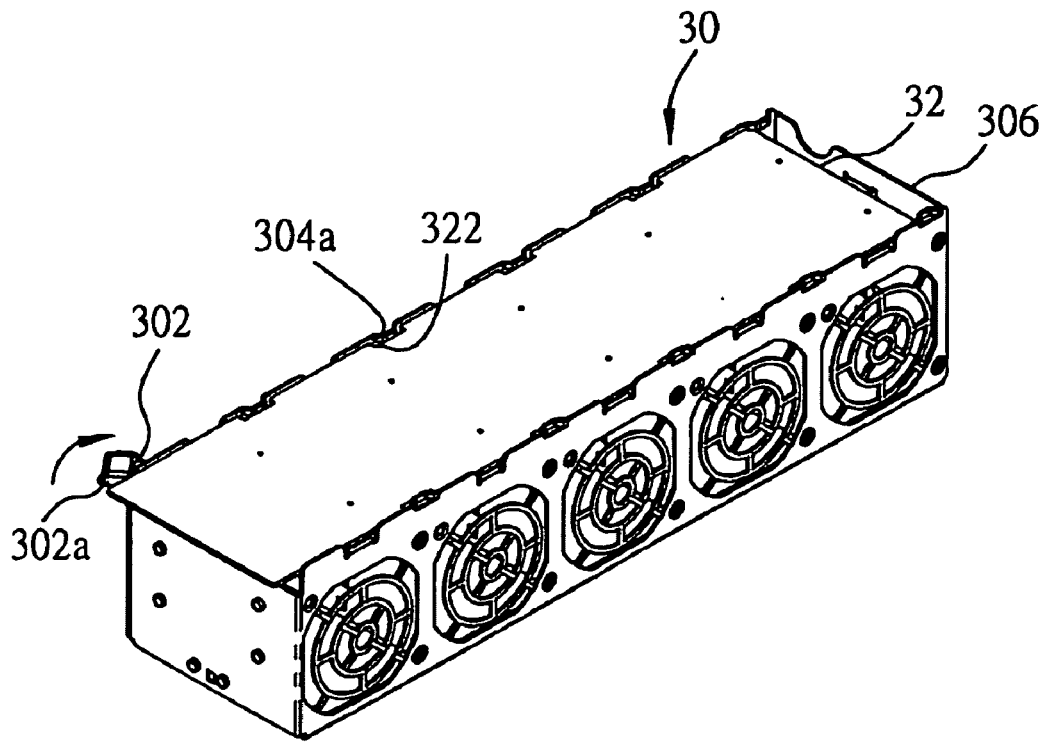
FIGS. 4A to 4C show schematic diagrams of assembling the fan cover heat dissipation assembly according to the present invention.
Figure 4B:
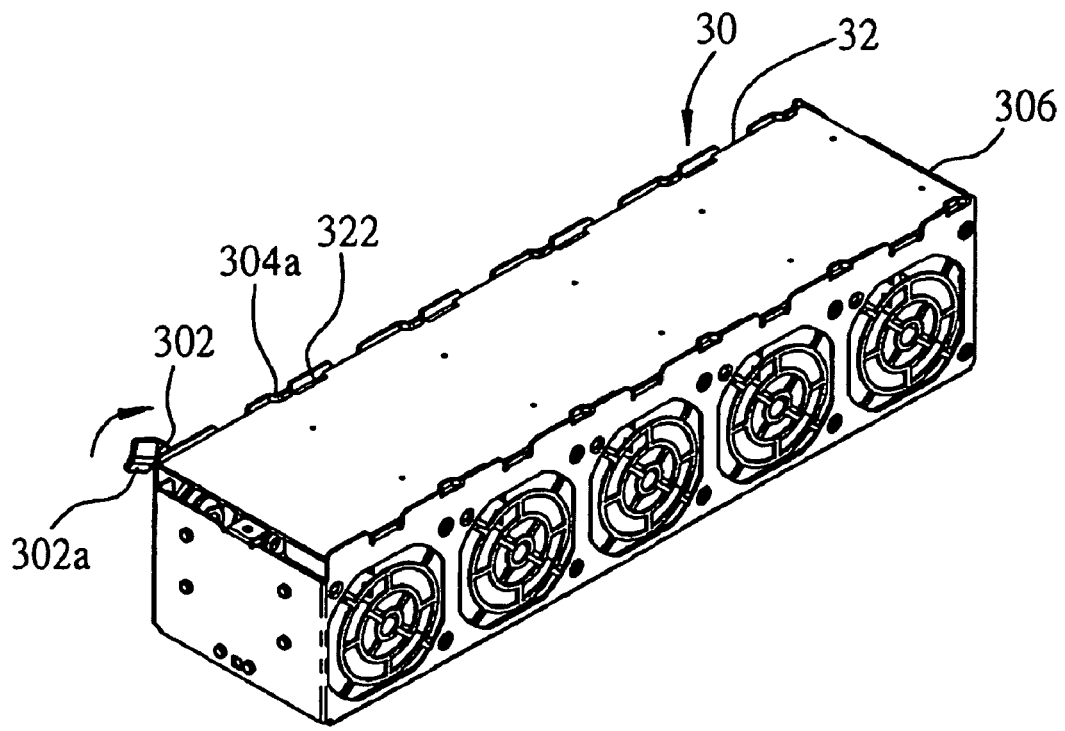
Figure 4C:
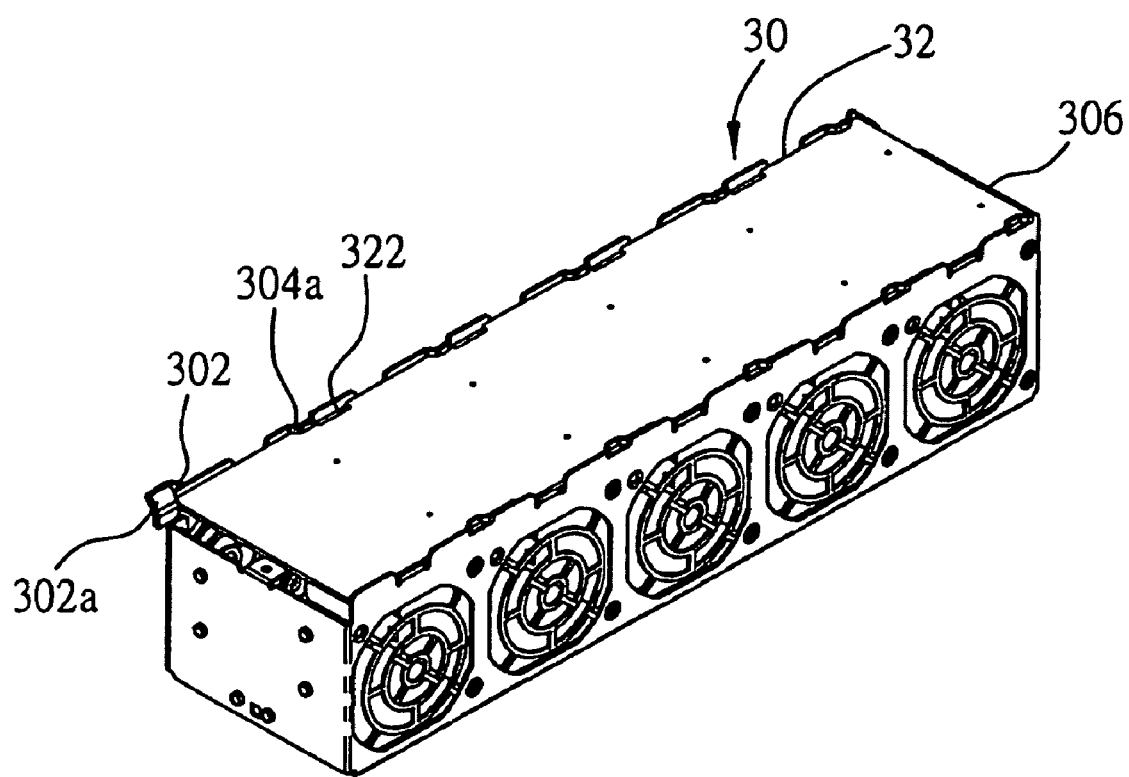

Referring to FIGS. 4A to 4C, a schematic assembly diagram of the fan cover assembly of the invention is illustrated. During assembly, as shown in FIG. 4A, the first blocking portion 302 is opened to allow the cover body 32 to pass through upper blocking portion 304a via the opening 322 and stop at the lower blocking portion 304b. Then, as shown in FIG. 4B, the cover body 32 is pushed to abut against the third blocking portion 306, and as shown in FIG. 4C, the first blocking portion 302 is closed to thereby tightly join the cover body 32 to the fan frame 30.

In conclusion, the fan cover heat dissipation assembly of the present invention assuredly achieves effectiveness of high temperature heat dissipation to improve on prior art shortcomings, and moreover is easily assembled by means of a simple configuration of a first blocking portion, a second blocking portion, and a third blocking portion disposed on the fan frame for fastening the cover body thereon. As it requires no extra fasteners or tools to assemble the fan frame with the cover body, the present invention can improve on the prior art to increase efficiency in assembly.

It should be noted that the embodiments described herein is merely illustrative of the principles of the invention and that a wide variety of modifications thereto may be effected by persons skilled in the art without departing from the spirit and scope of the invention as set forth in the following claims.

What is claimed is:

1. A fan cover heat dissipation assembly, for installing one or more fans therein, comprising:
    a fan frame having a first blocking portion, a second blocking portion, and a third blocking portion, wherein the second blocking portion comprises at least an upper blocking portion and at least a lower blocking portion, which are positioned in a stagger manner, allowing a containing space to be formed between the upper blocking portions and the lower blocking portions; and
    a cover body installed in the containing space of the fan frame, wherein edges of the fan cover are formed with a plurality of openings corresponding to the upper blocking portions, such that when the first blocking portion is opened to allow the cover body to pass through the upper blocking portions via the openings and stop at the lower blocking portions, the cover body is pushed to abut against the third blocking portion, and thereby the first blocking portion is closed to couple the cover body to the fan frame.

2. The fan cover heat dissipation assembly of claim 1, wherein the fan frame is made of a metallic material.

3. The fan cover heat dissipation assembly of claim 1, wherein the fan frame has an inverted U shaped.

4. The fan cover heat dissipation assembly of claim 1, wherein the first blocking portion is an elastic constituent element having one end thereof fastened onto one or more edges of the fan frame.

5. The fan cover heat dissipation assembly of claim 4, wherein the first blocking portion is fastened onto the one or more edges of the fan frame by means of welding, locking, or adhesion.

6. The fan cover heat dissipation assembly of claim 4, wherein the first blocking portion is a metal structure.

7. The fan cover heat dissipation assembly of claim 4, wherein the other end of the first blocking portion, free of being fastened onto the fan frame, is formed with a bending portion.

8. The fan cover heat dissipation assembly of claim 7, wherein the bending portion is formed by means of stamping.

9. The fan cover heat dissipation assembly of claim 1, wherein the second blocking portion is respectively formed on edges of the fan frame where two parallel sides of the cover body are mounted.

10. The fan cover heat dissipation assembly of claim 9, wherein a distance between the two parallel sides and a length of each of the sides respectively equal to or are slightly larger than a width and a length of the cover body, wherein each of the two sides comprises the one or more upper blocking portions and the one or more lower blocking portions, which are positioned in the stagger manner.

11. The fan cover heat dissipation assembly of claim 1, wherein a height of the containing space equals to or is slightly larger than that of the cover body.

12. The fan cover heat dissipation assembly of claim 1, wherein the upper blocking portions and the lower blocking portions are formed by means of stamping or forging.

* * * * *